US012722384B2

(12) United States Patent
Watanabe et al.

(10) Patent No.: US 12,722,384 B2
(45) Date of Patent: Sep. 1, 2026

(54) LIQUID EJECTION HEAD

(71) Applicant: CANON KABUSHIKI KAISHA, Tokyo (JP)

(72) Inventors: Makoto Watanabe, Kanagawa (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/761,030

(22) Filed: Jul. 1, 2024

(65) Prior Publication Data

US 2025/0010614 A1 Jan. 9, 2025

(30) Foreign Application Priority Data

Jul. 3, 2023 (JP) ................................ 2023-109082

(51) Int. Cl.
*B41J 2/175* (2006.01)

(52) U.S. Cl.
CPC ........... *B41J 2/17536* (2013.01); *B41J 2/175* (2013.01); *B41J 2/17503* (2013.01)

(58) Field of Classification Search
CPC .... B41J 2/17536; B41J 2/175; B41J 2/17503; C09J 2301/10; C09J 2301/122; C09J 2301/16; C09J 2301/18; C09J 2301/20
See application file for complete search history.

(56) References Cited

U.S. PATENT DOCUMENTS 7,350,898 B2 * 4/2008 Lee ........................ B41J 2/1753 347/85

FOREIGN PATENT DOCUMENTS

JP H06320741 A 11/1994

* cited by examiner

*Primary Examiner* — Geoffrey S Mruk
(74) *Attorney, Agent, or Firm* — Canon U.S.A., Inc. IP Division

(57) ABSTRACT

A liquid ejection head, having an ejection port surface that includes an ejection port from which liquid is to be ejected, includes a protective tape. The protective tape is attached to the ejection port surface to block the ejection port. The protective tape includes at least a base material and an adhesive agent. The adhesive agent has a slit extending to an end portion of the protective tape, and the slit communicates with the atmosphere.

16 Claims, 9 Drawing Sheets

LIQUID EJECTION HEAD

BACKGROUND

Field

The present disclosure relates to a liquid ejection head.

Description of the Related Art

Ejection ports of a liquid ejection head must be open during operation of the liquid ejection head to enable ejection of liquid (ink) therefrom. However, until a liquid ejection head is in the possession of a customer and is opened and used, it is necessary to prevent the ejection ports from clogging and a water-repellent layer of an ejection port surface from degrading due to seepage or evaporation of ink or the like. Accordingly, during distribution, it is possible to prevent ink from seeping or evaporating from the ejection ports and further protect the ejection ports and the water-repellent layer from external impacts or the like by protecting, with a peelable protective tape, the ejection port surface having the ejection ports from which ink droplets are ejected.

Japanese Patent Laid-Open No. H06-320741 discloses a protective tape having a slit. Japanese Patent Laid-Open No. H06-320741 discloses a protective tape structure in which the slit aligned with a bead (also referred to below as a sealant) that protects a conductor on the liquid ejection head is cut into the protective tape.

SUMMARY

According to an aspect of the present disclosure, a liquid ejection head having an ejection port surface that includes an ejection port from which liquid is to be ejected includes a protective tape attached to the ejection port surface to block the ejection port, wherein the protective tape includes at least a base material and an adhesive agent, where the adhesive agent has a slit extending to an end portion of the protective tape, and the slit communicates with the atmosphere.

Further features of the present disclosure will become apparent from the following description of exemplary embodiments with reference to the attached drawings.

DESCRIPTION OF THE EMBODIMENTS

In the technology in Japanese Patent Laid-Open No. H06-320741, when a protective tape has been attached to the ejection port surface, air bubbles generated between ejection port arrays and the like cannot be easily removed. Accordingly, when air bubbles are present directly above ejection ports, ink fixation due to ink bleeding in the ejection ports occurs and print quality may degrade.

The present disclosure provides a liquid ejection head that can remove air bubbles generated between the ejection port surface and the protective tape.

Embodiments of the present disclosure will be described in detail below.

First Embodiment

Figure 1A:
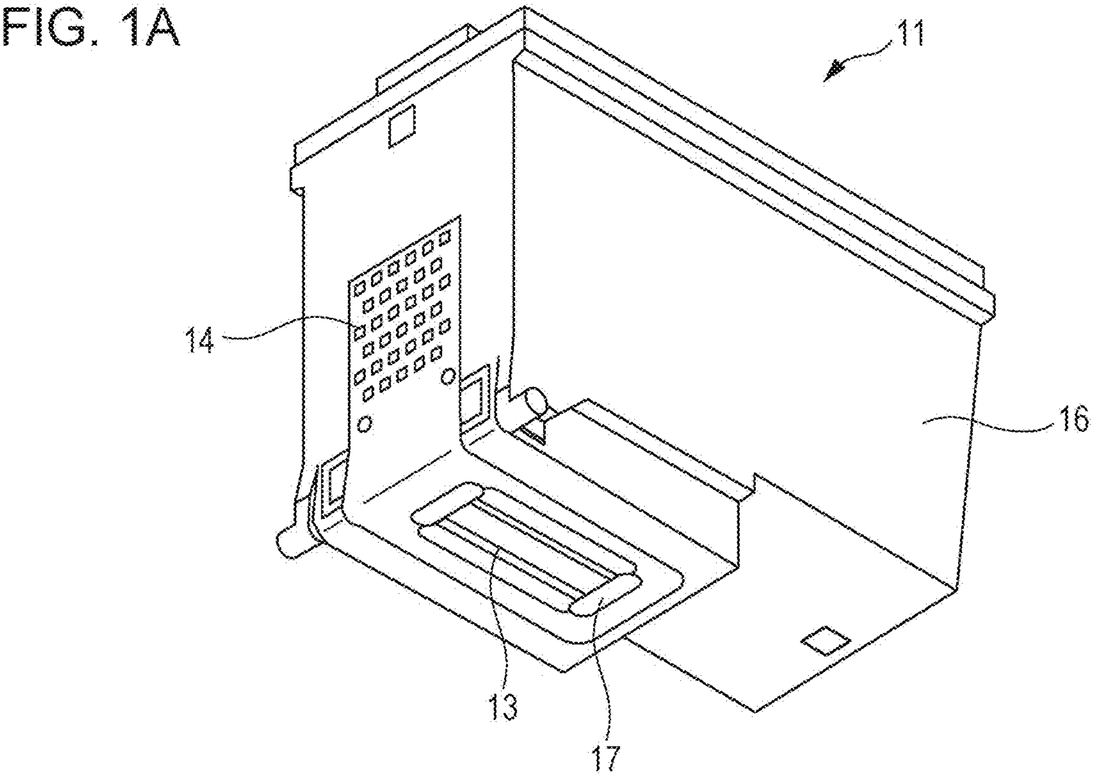
FIG. 1A is a perspective view illustrating a liquid ejection head to which a protective tape according to a first embodiment is not attached.
Figure 1B:
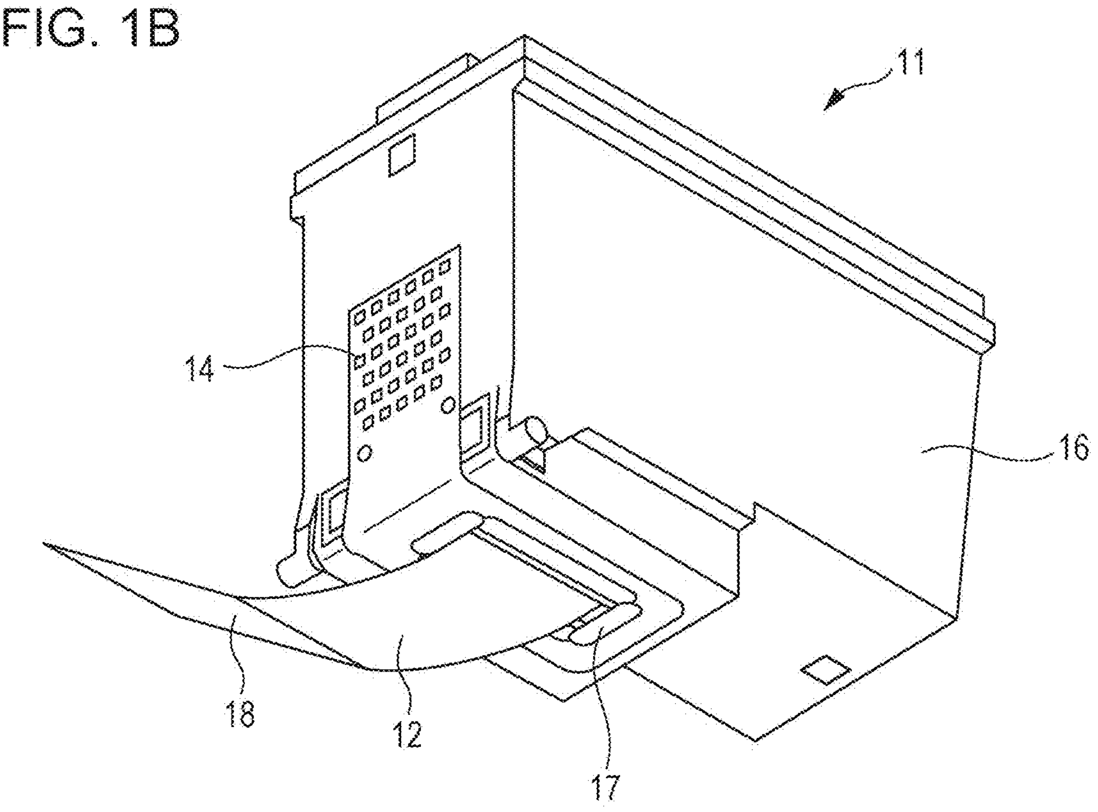
FIG. 1B a perspective view illustrating the liquid ejection head to which the protective tape according to the first embodiment has been attached.

FIG. 1A is a perspective view illustrating a liquid ejection head 11 to which a protective tape 12 according to an embodiment is not attached, and FIG. 1B is a perspective view illustrating the liquid ejection head 11 to which the protective tape 12 has been attached.

Figure 2:
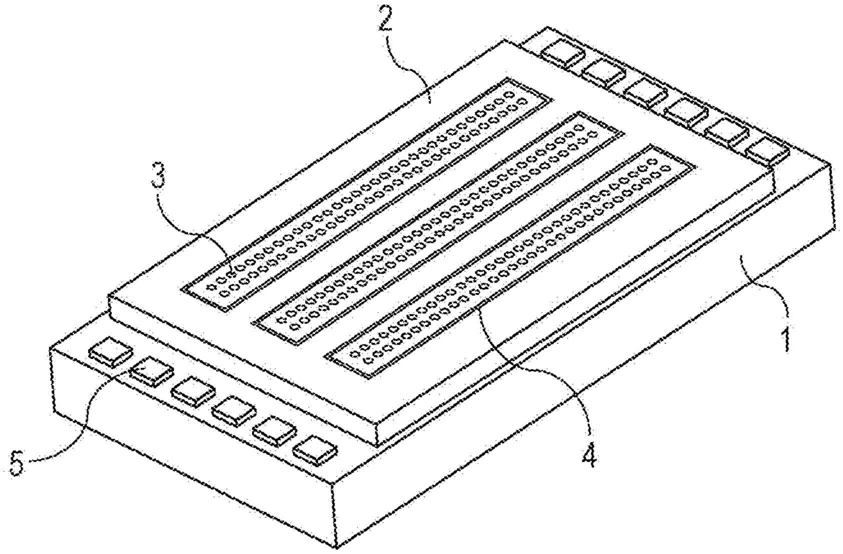
FIG. 2 is a perspective view illustrating a printing element substrate of the liquid ejection head in FIG. 1.

FIG. 2 is a perspective view of a printing element substrate 1 of the liquid ejection head 11 to which the protective tape 12 according to the embodiment is attached. An ejection port forming member 2 is formed on the printing element substrate 1 in FIG. 2. The ejection port forming member 2 has ejection ports 3 from which liquid is ejected, liquid chambers (not illustrated) in which liquids to be ejected are stored, and a flow path (not illustrated) through which the liquid is supplied. In addition, to distribute stress on the ejection port forming member 2, grooves 4 are formed in the ejection port forming member 2 to surround the ejection ports 3 formed along the liquid supply cavities. Electro-thermal conversion elements (not illustrated) that transfer energy to ink are formed in the liquid chambers to eject ink stored in the liquid chambers through the ejection ports 3. In addition, on the printing element substrate 1, electrode pads 5 with which electric current is exchanged are formed at end portions of wires that extend from the electro-thermal conversion elements and transfer electric energy to the electro-thermal conversion elements.

In the embodiment, the printing element substrate 1 includes the electro-thermal conversion elements that generate energy for ejecting ink. When electric power is supplied to the electro-thermal conversion elements, ink stored in the liquid chambers foams and is ejected. In addition, in the printing element substrate 1, electric wiring through which electric current is transferred to the electro-thermal conversion elements is formed by a film formation technique. In addition, liquid supply cavities 6 are formed by an etching technique to pass through the printing element substrate 1 and supply ink from the back surface of the printing element substrate 1 to the plurality of flow paths and the plurality of liquid chambers formed in the ejection port forming member 2 through the liquid supply cavities.

In the front surface of the printing element substrate 1, along long sides of the liquid supply cavities 6, a plurality of liquid flow paths and the plurality of liquid chambers that correspond to the electro-thermal conversion elements are formed by the ejection port forming member 2 with the liquid supply cavities 6 therebetween. In addition, the ejection ports 3 that communicate with the liquid chambers are formed in the ejection port forming member 2.

The ejection ports 3 are disposed at positions corresponding to the electro-thermal conversion elements disposed in the liquid chambers and eject ink stored in the liquid chambers. When the electro-thermal conversion elements of the printing element substrate 13 are driven, thermal energy is transferred to the ink, and the ink in the liquid chambers foams and is ejected through the ejection ports 3 onto a recording medium.

When a plurality of different colors of ink is ejected from a single printing element substrate 1, a liquid supply cavity 6 need be formed for each of the colors. The electro-thermal conversion elements are disposed along long sides of the liquid supply cavities with the liquid supply cavities therebetween, and the plurality of liquid flow paths, the plurality of liquid chambers, and the plurality of ejection ports 3 are formed by the ejection port forming member 2 to correspond to the electro-thermal conversion elements. Accordingly, with some exceptions, the printing element substrate 1 that ejects the plurality of colors of ink is larger than the printing element substrate 1 that ejects a single color of ink because the liquid supply cavities 6 are arranged in parallel.

Figure 3:
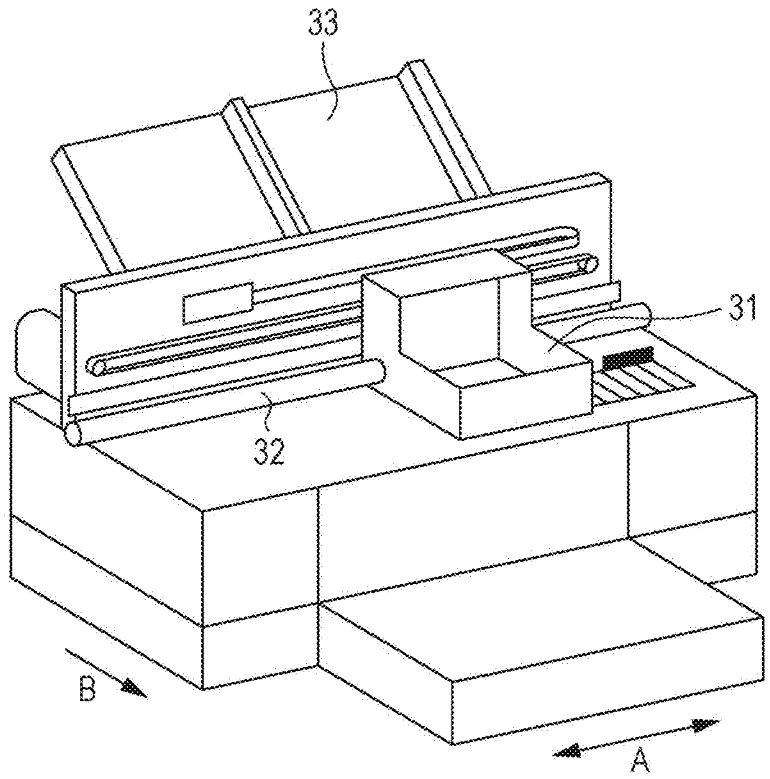
FIG. 3 is a perspective view illustrating a liquid printing device in which the liquid ejection head in FIG. 1A is installed.

An electric wiring tape 14 through which a drive signal and the like from the main body of the liquid ejection device illustrated in FIG. 3 are transferred is disposed around the printing element substrate 1. The electrode pad 5 of the printing element substrate 1 and the electric wiring tape 14 are connected via inner leads 15 to each other by using a bonding technique. This electrical connection portion and the inner leads 15 are covered with and protected by a sealant 17 that protects wiring. As illustrated in FIG. 1B, the protective tape 12 is attached to the surface of the ejection port part 2 of the printing element substrate 1 in which the ejection ports 3 are formed.

FIG. 3 is a perspective view of a liquid ejection device in which the liquid ejection head 11 illustrated in FIG. 1A is installed. In the liquid ejection device according to the embodiment, the liquid ejection head 11 illustrated in FIG. 1A is installed in the carriage 31 and performs recording on a recording medium. The carriage 31 is guided movably in main scanning directions, which are parallel to a guide shaft 32, indicated by double-headed arrow A. The guide shaft 32 is disposed to extend parallel to the width direction of the recording medium. The liquid ejection head 11 installed in the carriage 31 records characters, symbols, images, and the like by selectively ejecting a plurality of colors of ink while scanning in a direction intersecting a transport direction in which the recording medium is transported and by causing the ink to land on a recording sheet, which is the recording medium. It should be noted that any recording medium on which ink can land and an image can be formed may be used. For example, recording media of various materials and in various forms, such as paper, cloth, optical disk labels, plastic sheets, overhead projector sheets, and envelopes can be used as the recording media. As described above, the liquid ejection device is a so-called serial scan liquid ejection device that records an image while moving the liquid ejection head 11 in a main scanning direction and transporting the recording medium in a sub-scanning direction. The carriage 31 is equipped with a plurality of liquid ejection heads 11 that corresponds to the types of ink that can be ejected from the liquid ejection device. The recording media are loaded onto a paper feed unit 33 and transported by a transport roller in the sub-scanning direction indicated by arrow B.

The liquid ejection device alternately repeats a recording operation that ejects ink while moving the liquid ejection head 11 installed in the carriage 31 in the main scanning direction and a transport operation that transports the recording medium in the sub-scanning direction. As a result, an image is sequentially recorded on the recording medium. When ink is ejected, in accordance with recording data, electric current is supplied from the inner lead 15 to the electrode pads 5 at a predetermined timing. When electric current is supplied to the electrode pads 5, the electric current is supplied from the electrode pads 5 to the electro-thermal conversion elements through the wiring. When electric current is supplied to the electro-thermal conversion element as described above, thermal energy is transferred to the ink, and the ink in the liquid chambers foams and is ejected onto the recording medium through the ejection ports 3.

It should be noted that the cartridge-type liquid ejection head 11 in which the recording unit including the printing element substrate 13 is formed integrally with an ink storage container 16 is described in the embodiment, but the present disclosure is not limited to this example. The recording unit may be detachable from the ink storage container.

In addition, the liquid ejection device described above is a so-called serial scan recording device that records an image while moving the liquid ejection head 11 in the main scanning direction and transporting the recording medium in the sub-scanning direction. However, the present disclosure is also applicable to a full-line liquid ejection device that uses a liquid ejection head extending across the entire region of the recording medium in the width direction.

In addition, the liquid ejection head according to the embodiment uses a method that foams ink in the liquid chambers and ejects ink droplets by generating thermal energy by using the electro-thermal conversion elements, but the present disclosure is not limited to this method. This liquid ejection head may also be applied to a liquid ejection device that ejects ink or liquid in the liquid election head by deforming a piezoelectric element, or a liquid ejection head of another type may also be applied to the recording device according to the present disclosure.

Next, the structure of the protective tape 12 will be described.

Figure 4:
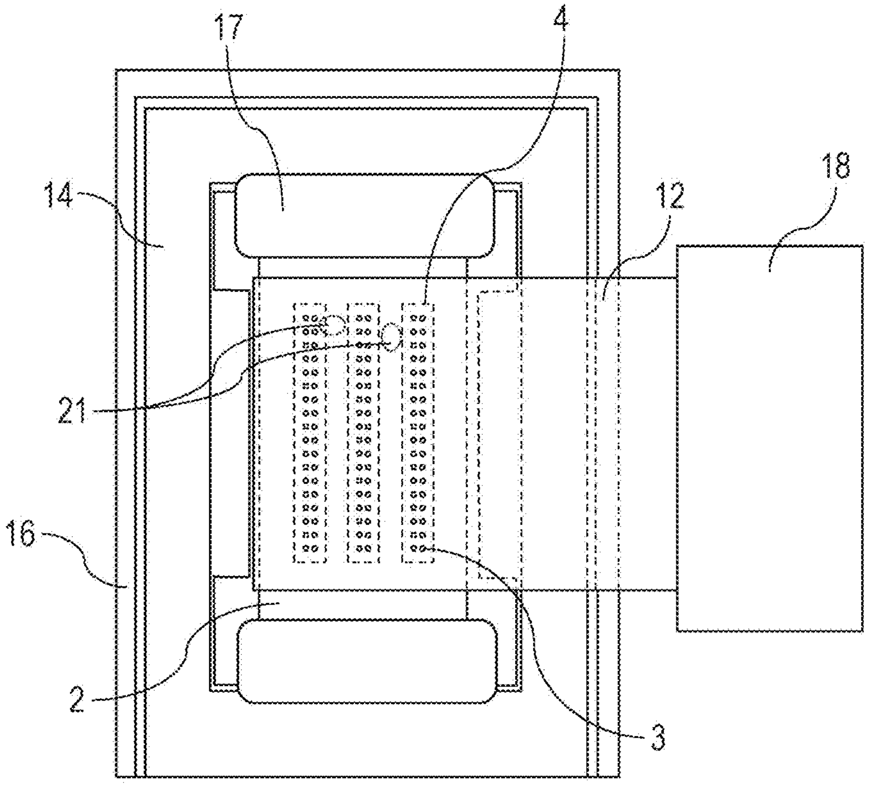
FIG. 4 is a schematic view illustrating a comparative protective tape.

FIG. 4 is a plan view illustrating surroundings of a comparative protective tape 12 with the protective tape 12 attached to the printing element substrate 13. The protective tape 12 to be attached to the liquid ejection head 11 includes a tag tape (tag member) 18 having no adhesiveness and a protective tape 12 body having adhesiveness on the adhesive surface. The tag tape 18 is a non-adhesive portion that is held by fingers when a user peels the protective tape 12 from the liquid ejection head 11.

The protective tape 12 body is attached to prevent ink from seeping from or evaporating from the ejection ports 3 through which the ink is ejected and to protect the surface of the ejection port forming member 2 in which the ejection ports 3 are formed.

However, since the liquid ejection head 11 becomes longer as printing speed increases, air bubbles 21 are caught between the liquid supply cavities 6 if the protective tape 12 is attached to the ejection port surface of the ejection port forming member 2. This is because portions near the liquid supply cavities 6 are raised due to the stress of members effected by heat and the like since the volume of the ejection port forming member 2 increases as the liquid ejection head becomes longer. Since portions between the liquid supply cavities 6 are lower than the raised portions near the liquid supply cavities 6, the air bubbles 21 are easily caught if the protective tape 12 is attached.

When the protective tape 12 peels off or ink bleeding from the ejection ports 3 to the ejection port surface occurs because the air bubbles are generated directly above the ejection ports 3, and the ink bleeding extends over the liquid supply cavities 6, color mixing may occur.

Accordingly, in the embodiment, a slit extending to an end portion of the protective tape is formed in the adhesive agent of the protective tape. In addition, a plurality of slits 13 extending to both end portions of the protective tape can be formed along the ejection port array (in the direction in which the ejection ports are arranged) with the liquid supply cavities 6 therebetween.

Figure 5A:
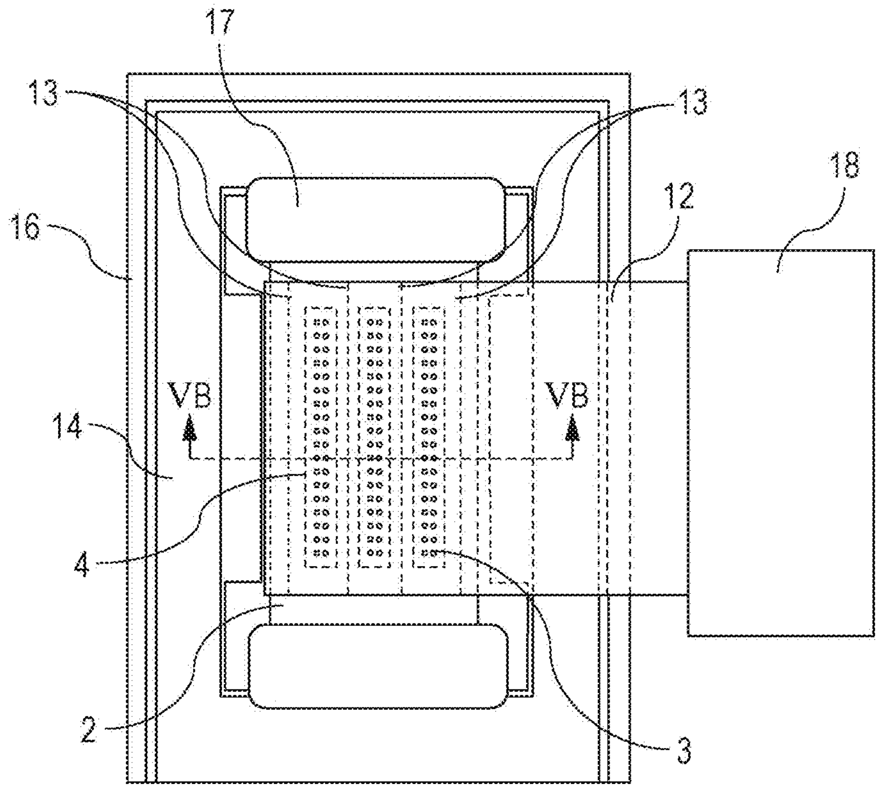
FIG. 5A illustrates a plan view.
Figure 5B:
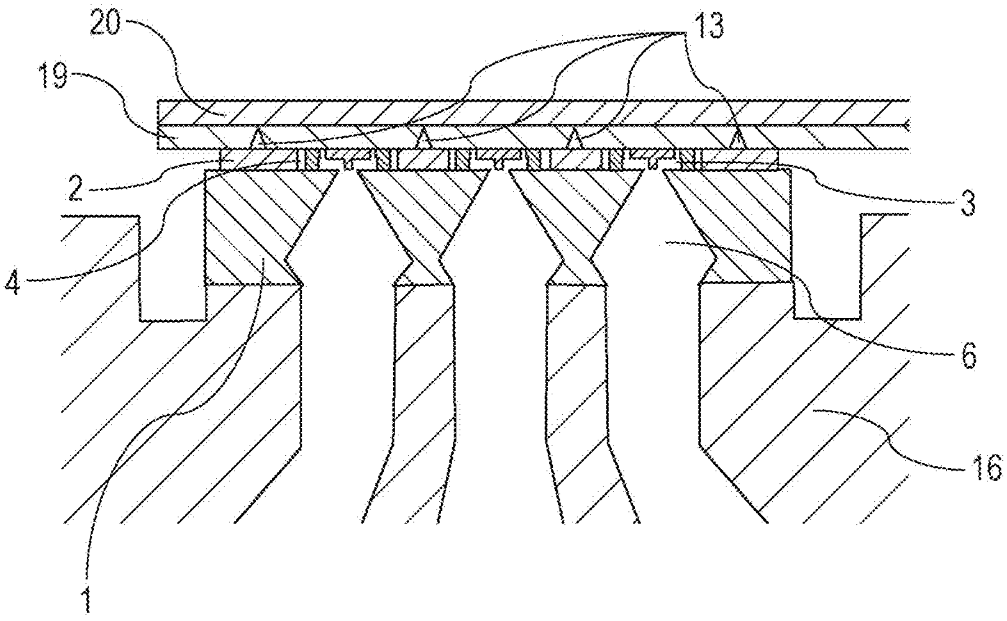
FIG. 5B illustrates a cross-sectional view, of the liquid ejection head to which the protective tape according to the first embodiment has been attached.

FIG. 5A is a plan view illustrating the surroundings of the protective tape 12 according to the embodiment with the protective tape 12 attached to the ejection port surface of the printing element substrate 1, and FIG. 5B is a cross-sectional view taken along line VB-VB. The protective tape 12 includes a base material 20 and an adhesive agent 19. As illustrated in FIG. 5B, the slits 13 formed in the adhesive agent 19 of the protective tape 12 are arranged parallel to the plurality of liquid supply cavities 6 therebetween and communicate with the atmosphere such as surrounding air at both end portions of the protective tape 12. Each of the slits 13 is formed between the ejection port arrays. It should be noted that the slits 13 are illustrated by dotted lines in FIG. 5A, but the slits 13 need not be formed intermittently. That is, the slits 13 may extend continuously from one end portion to the other end portion of the protective tape. In addition, the slits 13 can also be formed between an endmost ejection port array of the plurality of ejection port arrays and an end portion of the protective tape disposed in a direction intersecting the ejection port arrays. This can remove, to the outside, not only air bubbles generated between the ejection port arrays (between the liquid supply cavities) but also air bubbles generated near the end portions of the protective tape.

Figure 6A:
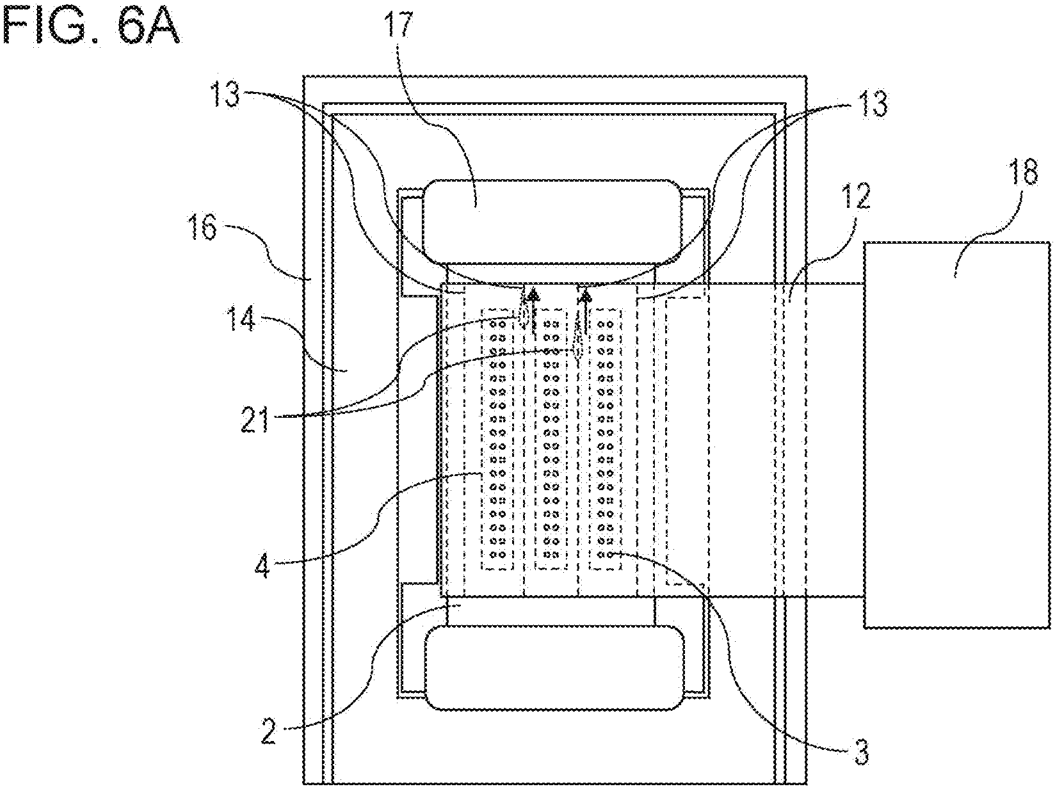
FIG. 6A and FIG. 6B are plan views of the liquid ejection head to which the protective tape according to the first embodiment has been attached.
Figure 6B:
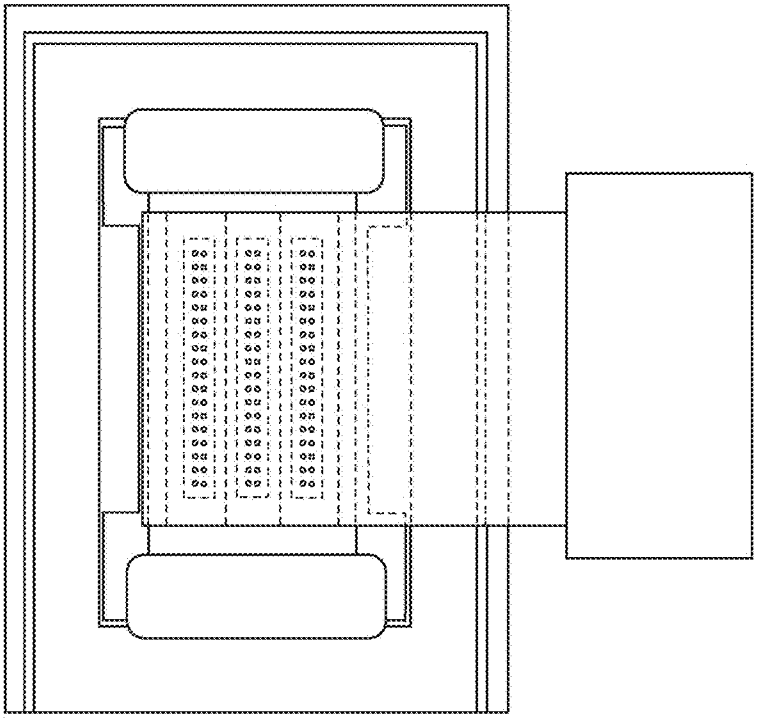

FIGS. 6A and 6B are plan views illustrating the surroundings of the protective tape 12 according to the embodiment with the protective tape 12 attached to the printing element substrate 1. FIG. 6A illustrates the state in which air bubbles are being released with the protective tape attached, and FIG. 6B illustrates the state in which air bubbles have been released after the protective tape is attached. In the structure according to the embodiment, the air bubbles 21 between the liquid supply cavities 6 that are generated when the protective tape 12 is attached tend to be released from the slits 13 to the atmosphere at the end portion of the protective tape 12. In addition, since the air bubbles 21 between the liquid supply cavities 6 have been released, the air bubbles are suppressed from being generated near the ejection ports 3. The slits 13 are formed in the middle of the liquid supply cavities 6 and outside the liquid supply cavities 6 at both end portions even when the number of rows of the liquid supply cavities 6 is increased to correspond to the number of rows of the liquid supply cavities 6. As a result, the number of the slits formed is one more than the number of the liquid supply cavities 6.

The slits 13 have a length equal to the width of the protective tape 12 to release the air bubbles 21 to the outside and communicate with the outside. The width of the slits 13 is preferably 0.2 mm to 0.3 mm such that the air bubbles 21 are easily released. When the width of the slits is less than 0.2 mm, the air bubbles are not easily released. When the width is 0.4 mm or more, the air bubbles are more easily released, but the distance between the ejection ports 3 and the slits 13 becomes closer if the distance between colors is small, and accordingly, adhesion may be reduced.

The depth of the slits 13 is equal to the thickness of the adhesive agent 19, and the shape thereof is a V or concave shape. A coating machine used to form the adhesive agent layer is not particularly limited as long as the coating machine is used for normal coating of an adhesive agent solution. For example, a knife coater, a comma coater, a roll coater, or the like may be used as the coating machine that can accurately adjust the thickness of the adhesive agent and apply the adhesive agent with high productivity. It is possible to appropriately select, as an application method, a method that directly applies an adhesive agent solution to the base material 20 and dries the applied solution or a transfer method that applies an adhesive agent solution to a stripping sheet and dries the applied solution to form a layer of the adhesive agent 19 and attaches the formed layer to the base material. As a result, the slits 13 can be formed in the layer of the adhesive agent 19. When the protective tape 12 is attached to the ejection port forming member 2 with the slits 13 formed in the adhesive agent 19 accurately located between the liquid supply cavities 6, a mark for positioning between the ejection ports and the protective tape is provided on the protective tape 12 and an image processing technique is used. The mark provided on the tape may have any dimensions that fit within a field of view of the device and may have a binarizable shape. The slits 13 can suppress the air bubbles 21 from being accumulated during attachment, improve the sealing properties of the surface of the ejection port forming member 2 in which ejection ports 3 are formed, and enable high-quality recording. In addition, a high yield can be achieved by improving the sealing properties of the ejection port forming surface 11 also in the head manufacturing process and the recording device packaging process. It should be noted that an example in which the liquid ejection head is formed integrally with an ink tank has been described in the embodiment, but the embodiment is not limited to this example, and a system in which the liquid ejection head is detachable from the ink tank may be adopted.

Second Embodiment

Figure 7A:
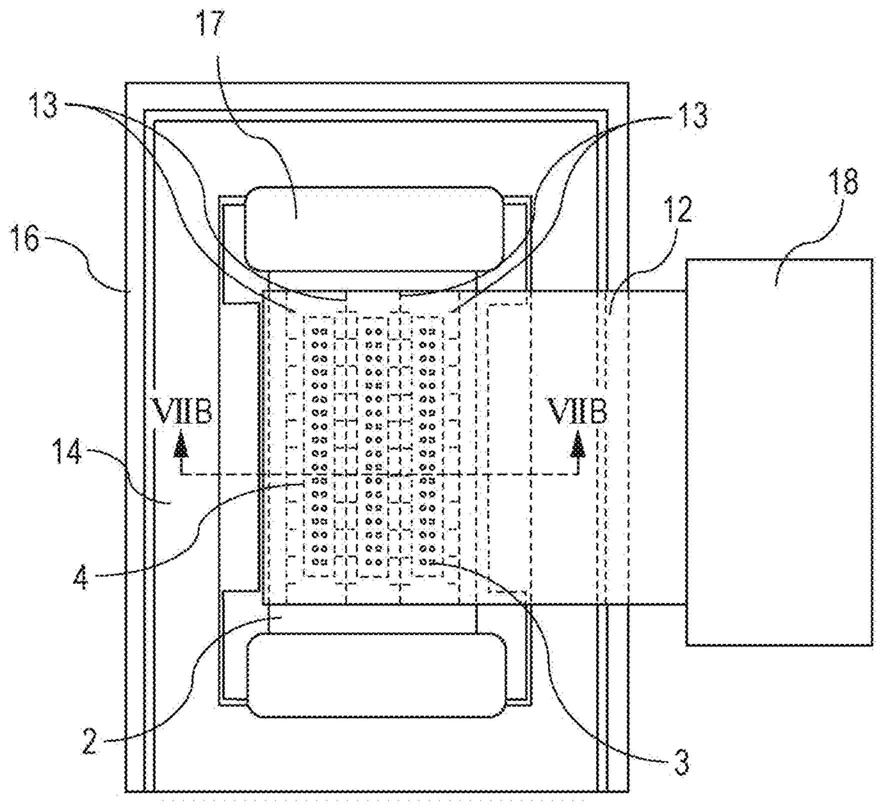
FIG. 7A illustrates a plan view.
Figure 7B:
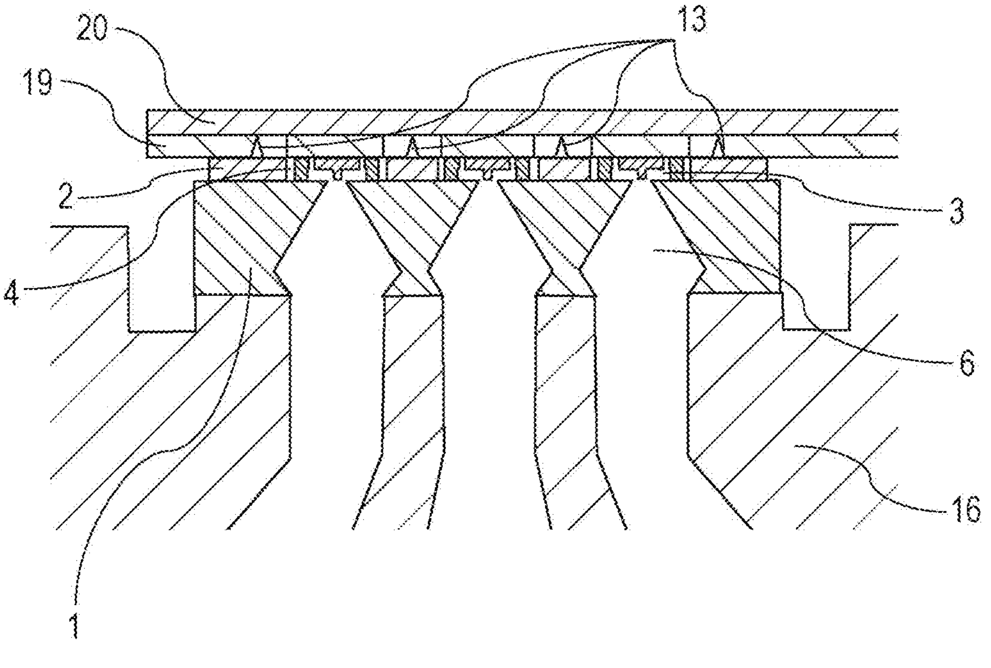
FIG. 7B illustrates a cross-sectional view, of the liquid ejection head to which a protective tape according to a second embodiment has been attached.

FIG. 7A is a plan view illustrating surroundings of the protective tape 12 according to the embodiment with the protective tape 12 attached to the printing element substrate 1 and FIG. 7B is a cross-sectional view taken along line VIIB-VIIB. As in the first embodiment, to release the air bubbles 21 with the protective tape 12 attached, the slits 13 are formed parallel to each other with the liquid supply cavities 6 therebetween in the adhesive agent 19 of the protective tape 12 so as to extend to both end portions of the protective tape 12. In addition, second slits 13 extending vertically branch from the slits 13 to the liquid supply cavities 6. The branched slits 13 extending vertically may extend to the groove 4 surrounding the ejection ports 3 formed in the surface of the ejection port forming member 2. The width of the branched slits 13 is preferably 0.2 mm to 0.3 mm as with the slits 13 formed parallel to the liquid supply cavities 6 such that the air bubbles 21 are easily released. In addition, the arrangement interval is preferably about 0.9 mm to 1.1 mm in consideration of the size of air bubbles generated between the liquid supply cavities 6. The slits 13 formed in the layer of the adhesive agent 19 of the protective tape 12 can suppress the air bubbles 21 from being accumulated during attachment.

Third Embodiment

Figure 8A:
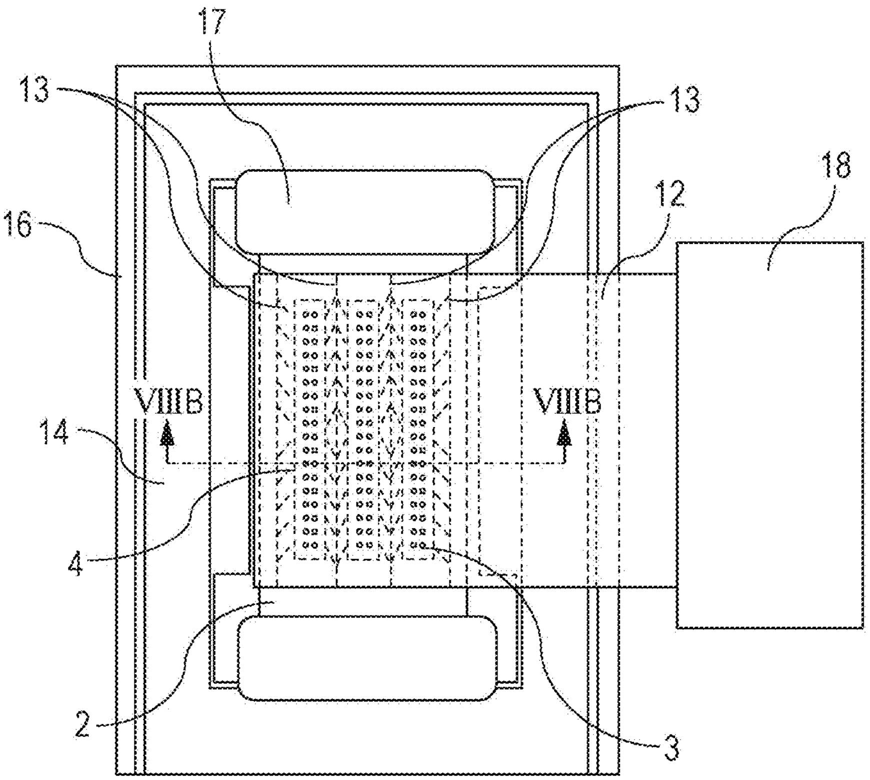
FIG. 8A illustrates a plan view.
Figure 8B:
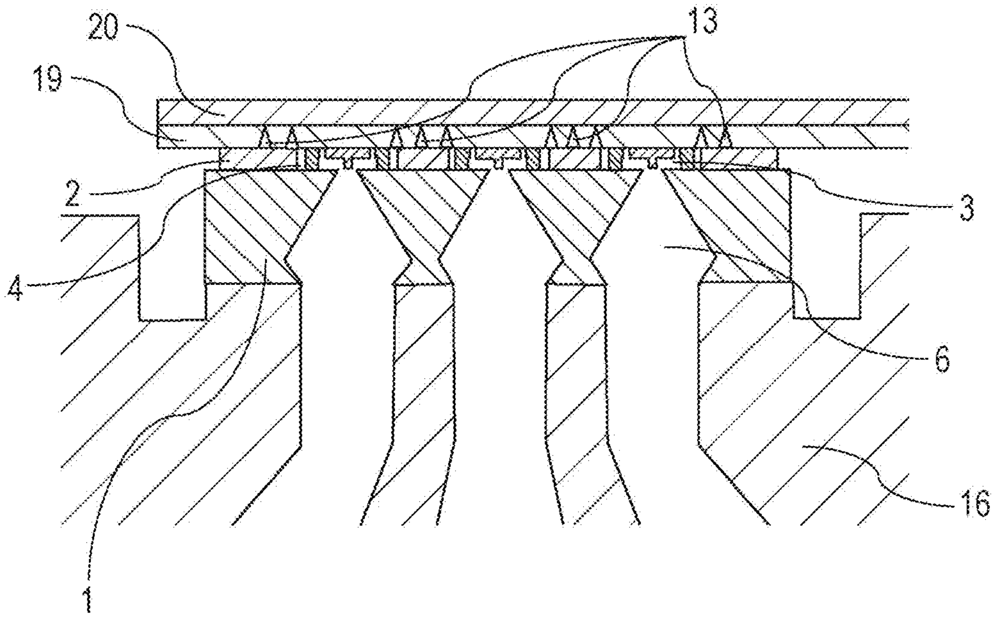
FIG. 8B illustrates a cross-sectional view, of the liquid ejection head to which a protective tape according to a third embodiment has been attached.

FIG. 8A is a plan view illustrating surroundings of the protective tape 12 according to the embodiment with the protective tape 12 attached to the printing element substrate 1 and FIG. 8B is a cross-sectional view taken along line VIIIB-VIIIB. As in the first embodiment, to release the air bubbles 21 with the protective tape 12 attached, the slits 13 are formed parallel to each other with the liquid supply cavities 6 therebetween in the adhesive agent 19 of the protective tape 12 so as to extend to both end portions of the protective tape 12. In addition, other slits 13 obliquely branch from the slits 13 to the liquid supply cavities 6. The branched slits 13 extending obliquely may extend to the groove 4 surrounding the ejection ports 3 formed in the surface of the ejection port forming member 2 as in the second embodiment. The width of the branched slits 13 is preferably 0.2 mm to 0.3 mm as with the slits 13 formed parallel to the liquid supply cavities 6 such that the air bubbles 21 are easily released. In addition, as in the first embodiment, the arrangement interval of the second slits is preferably about 0.9 mm to 1.0 mm in consideration of the size of air bubbles generated between the liquid supply cavities 6. The slits 13 formed in the layer of the adhesive agent 19 of the protective tape 12 can suppress the air bubbles 21 from being accumulate during attachment.

Fourth Embodiment

Figure 9A:
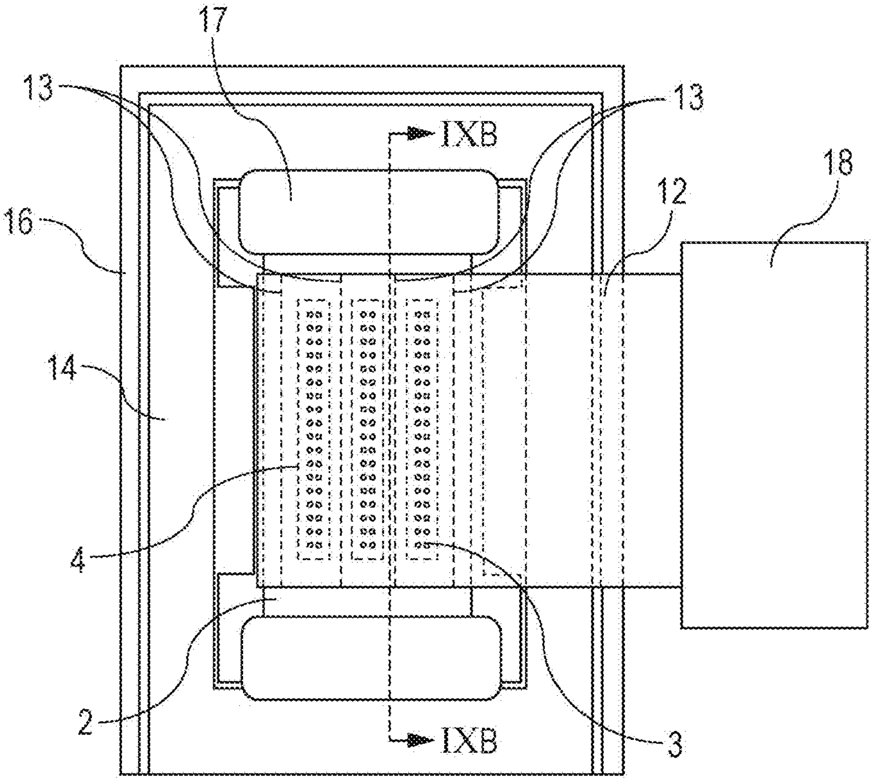
FIG. 9A illustrates a plan view.
Figure 9B:
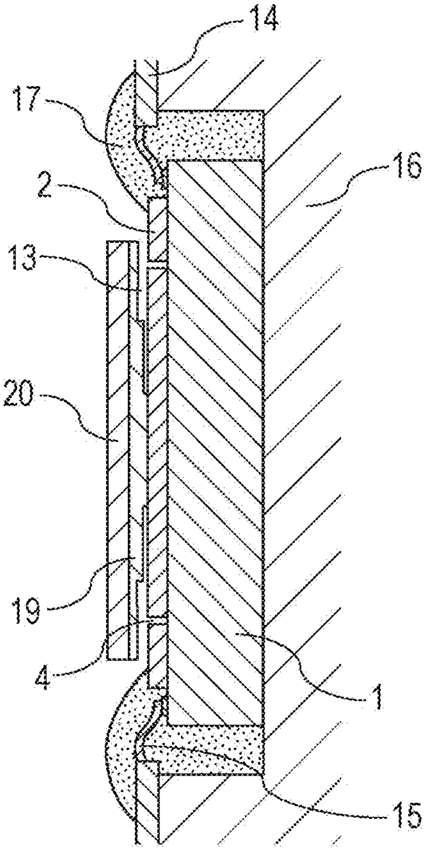
FIG. 9B illustrates a cross-sectional view, of the liquid ejection head to which a protective tape according to a fourth embodiment has been attached.

FIG. 9A is a plan view illustrating surroundings of the protective tape 12 according to the embodiment with the protective tape 12 attached to the printing element substrate 1 and FIG. 9B is a cross-sectional view taken along line IXB-IXB. As in the first embodiment, to release the air bubbles 21 with the protective tape 12 attached, the slits 13 are formed parallel to each other with the liquid supply cavities 6 therebetween in the adhesive agent 19 of the protective tape 12 so as to extend to both end portions of the protective tape 12. The present embodiment differs from the embodiments described above in that the thickness of portions of the adhesive agent 19 that correspond to the slits 13 is gradually decreased toward the outside in the direction of the ejection ports 3 such that the air bubbles 21 are easily released to the outside of the protective tape 12.

The slits 13 formed in the layer of the adhesive agent 19 of the protective tape 12 can suppress the air bubbles 21 from being accumulate during attachment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-109082, filed Jul. 3, 2023, which is hereby incorporated by reference herein in its entirety.

What is claimed is:

1. A liquid ejection head having an ejection port surface that includes an ejection port from which liquid is to be ejected, the liquid ejection head comprising:

a protective tape attached to the ejection port surface to block the ejection port, wherein the protective tape includes at least a base material and an adhesive agent, where the adhesive agent has a slit extending to an end portion of the protective tape, and the slit communicates with the atmosphere.

2. The liquid ejection head according to claim 1, wherein the slit is formed along an ejection port array including a plurality of ejection ports that is arranged, and the ejection port is one of the plurality of ejection ports.

3. The liquid ejection head according to claim 2, wherein a plurality of ejection port arrays is formed, the ejection port array is one of the plurality of ejection port arrays, and the slit is formed between the plurality of ejection port arrays.

4. The liquid ejection head according to claim 3, wherein the slit is formed between an endmost ejection port array of the plurality of ejection port arrays and an end portion of the protective tape, where the end portion is disposed in a direction intersecting the ejection port array.

5. The liquid ejection head according to claim 1, wherein the slit extends to an end portion of the protective tape, and the end portion is disposed in a direction in which a plurality of ejection ports is arranged.

6. The liquid ejection head according to claim 1, wherein the slit extends from one end portion to another end portion of the protective tape, and the one end portion and the other end portion are disposed in a direction in which a plurality of ejection ports is arranged.

7. The liquid ejection head according to claim 1, further having a liquid supply cavity through which the liquid is to be supplied to the ejection port, wherein the slit is formed along the liquid supply cavity as viewed in a direction orthogonal to the ejection port surface.

8. The liquid ejection head according to claim 7, wherein a plurality of liquid supply cavities is formed, the liquid supply cavity is one of the plurality of liquid supply cavities, and the slit is formed between the plurality of liquid supply cavities as viewed in the direction orthogonal to the ejection port surface.

9. The liquid ejection head according to claim 8, wherein the slit is formed between an endmost liquid supply cavity of the plurality of liquid supply cavities and an end portion of the protective tape, where the end portion is disposed in a direction intersecting a direction in which a plurality of ejection ports is arranged.

10. The liquid ejection head according to claim 7, wherein a number of a plurality of slits is one more than a number of the plurality of liquid supply cavities, and the slit is one of the plurality of slits.

11. The liquid ejection head according to claim 7, wherein the adhesive agent has a second slit that extends to the liquid supply cavity.

12. The liquid ejection head according to claim 11, wherein a width of the second slit is not less than 0.2 millimeter (mm) and not more than 0.3 mm.

13. The liquid ejection head according to claim 11, wherein a plurality of second slits is formed, the second slit is one of the plurality of second slits, and the plurality of second slits is disposed at intervals not less than 0.9 millimeter (mm) and not more than 1.0 mm.

14. The liquid ejection head according to claim 1, wherein a width of the slit is not less than 0.2 millimeter (mm) and not more than 0.3 mm.

15. The liquid ejection head according to claim 1, wherein the protective tape has a mark for positioning between the ejection port surface and the protective tape.

16. The liquid ejection head according to claim 1, wherein a thickness of a portion of the adhesive agent in which the slit is formed is reduced toward the end portion of the protective tape.

* * * * *